United States Patent
Pohlmann

(10) Patent No.: US 7,998,442 B2
(45) Date of Patent: Aug. 16, 2011

(54) SOUND INSULATING BOARD

(75) Inventor: Cevin Marc Pohlmann, Hoisdorf (DE)

(73) Assignee: Kronotec AG, Lucerne (CH)

( * ) Notice: Subject to any disclaimer, the term of this patent is extended or adjusted under 35 U.S.C. 154(b) by 1280 days.

(21) Appl. No.: 11/280,629

(22) Filed: Nov. 16, 2005

(65) Prior Publication Data

US 2006/0234019 A1    Oct. 19, 2006

(30) Foreign Application Priority Data

Nov. 16, 2004   (DE) .......................... 10 2004 056 131

(51) Int. Cl.
*B32B 27/14*    (2006.01)
*B32B 3/26*     (2006.01)
*B32B 5/16*     (2006.01)

(52) U.S. Cl. ......... 423/198; 428/323; 428/403; 428/514

(58) Field of Classification Search ........................ None
See application file for complete search history.

(56) References Cited

U.S. PATENT DOCUMENTS 6,355,079 B1 * 3/2002 Sorvari et al. .................. 55/486

FOREIGN PATENT DOCUMENTS

| DE | 3731417 | * 12/1988 |
|----|---------|-----------|
| DE | 44 28 613 A1 | 2/1996 |
| DE | 196 37 635 A1 | 3/1998 |
| DE | 299 01 015 U1 | 6/1999 |
| DE | 201 00 632 U1 | 4/2002 |
| DE | 100 56 829 A1 | 6/2002 |
| EP | 0 971 080 A1 | 1/2000 |
| JP | 2000-034800 | 2/2000 |
| WO | 95/34722 | 12/1995 |

* cited by examiner

*Primary Examiner* — D. Lawrence Tarazano
*Assistant Examiner* — Camie Thompson
(74) *Attorney, Agent, or Firm* — Laurence A. Greenberg; Werner H. Stemer; Ralph E. Locher

(57) ABSTRACT

The invention relates to a sound-insulating board, in particular a footfall insulating board for laminate floors or similar applications. The sound-insulating board is distinguished by a continuous transition of its density from the one large-area side to the other large-area side of the board and comprises a mixture of unglued wood fibers, a binder and/or supporting fibers and a mixed plastic, such as arises from the dual system during the recovery of plastic parts.

20 Claims, 1 Drawing Sheet

(A)

SOUND INSULATING BOARD

BACKGROUND OF THE INVENTION

Field of the Invention

The invention relates to a sound-insulating board for forming laminate floors or parquet, as a floor-leveling board over large areas and as a wall and ceiling element for dry construction.

An extremely wide range of boards are known, for example for damping footfalls. They are composed, for example, of rock wool which is held together by a binder. The strength of these boards is low. If the strength value is increased, this is done by adding relatively large quantities of binder or fillers with high specific weights. With these, however, the sound-damping effect decreases.

For example, DE Utility Model 201 00 632 U1 discloses a sound-damping board for laminate floors or other applications, which comprises a mixture of unglued natural raw material fibers, such as wood fibers, a binder, such as thermoplastic adhesive fibers, and high-density fillers with a specific weight of more than 2000 kg/m$^3$. The high-density fillers are inlaid in the sound-damping board in such a way that they ensure a continuous transition in its density from the one large-area side to the other large-area side of the mat. As a result of the high specific weight of the fillers in the sound-damping board, the latter is not very elastic.

SUMMARY OF THE INVENTION

The invention is based on the object of providing a sound-insulating board for forming laminate floors, as a floor-leveling board or for dry construction which sound-insulating board, in addition to high sound insulation, in particular footfall insulation, also has an adequate compressive strength and is simple to produce.

According to the invention, the sound-insulating board has a continuous transition in its density from the one large-area side to the other large-area side and comprises a mixture of unglued wood fibers, a thermoplastic synthetic resin adhesive fiber and/or a supporting fiber and a mixed plastic, such as arises from the dual system during the recovery of plastic parts. The term "dual system" represents a recycling circuit of plastics with recycling.

The supporting fibers, which wholly or partly replace the synthetic resin adhesive fibers, are those from plants such as, for example, hemp, straw, flax, sisal or any other plant with long fibers. Alternatively or in addition to the plant fibers, it is of course possible for synthetic resin fibers to be used, for example polyamide fibers. The supporting fibers used have a length of 1 to 20 cm, preferably 13 to 15 cm.

The sound-insulating board according to the invention has a bulk density of 130-260 kg/m$^3$ and is fabricated in thicknesses from 3-20 mm. In the case of boards with thicknesses from 3-6 mm, the bulk density is preferably around 200-260 kg/m$^3$ and, in the case of boards with thicknesses from 7-20 mm, the bulk density is around 130-220 kg/m$^3$.

In this case, the initial material according to the invention has a composition of
- 50 to 60% of unglued wood fibers,
- 8 to 10% binder and/or supporting fibers and
- 42 to 30% of mixed plastics.

The unglued wood fibers used have a length of 0.3 to 1.2 cm, preferably 0.7 to 1 cm and in particular of 0.85 to 0.95 cm, proportions of lower fiber lengths (dusts) not being disruptive.

In order to improve the sound-insulating board according to the invention with regard to moisture resistance and flame prevention, the untreated wood fibers can be provided with a hydrophobicizing agent and/or flame prevention agent.

The binder is preferably composed of thermoplastic synthetic resins in the form of adhesive fibers. Those binders which have a flow transition range from 70 to 190° C. are particularly suitable.

If the synthetic resin adhesive fibers are wholly or partly replaced by supporting fibers, in the case of the mixed plastics from the dual system, those which contain a greater proportion of adhesive synthetic resins are selected.

By means of the heat supplied by the oven, sufficient quantities of the mixed plastic are then brought into the flow transition range and perform the function of the binder.

The proportion of mixed plastic from the dual system has a particle size of 2.0 to 0.1 mm, preferably of 0.2 mm.

In order to produce the sound-insulating board according to the invention, the constituents are mixed in the desired composition and are blown out of a storage container, for example by means of a blower, onto a continuously moved transport belt. As a result of the different specific weight of the wood fibers and of the mixed plastic, the fine wood particles have a longer flight path and settle on the surface of the mass applied to the transport belt. The mixed plastic particles cover a shorter flight path and form the lower layer of the continuous material webs that are produced. In this case, there is no sharp transition from one material to the other, instead the density of the material web increases continuously from top to bottom.

Should a specific layer structure be desired, for example over the width of the material web, further storage containers can be arranged above the transport belt. In this case, the masses to be applied in these storage containers can have the same and also different compositions.

The layer thickness of the sound-insulating boards to be produced can be adjusted by means of different speeds of the transport belt, by means of the quantity of mass applied per unit time or by means of a combination of both the aforementioned measures.

Following the application of the mass, the transport belt is led to an oven which has sufficiently high temperatures in order that the flow transition range of the adhesive fibers used is reached. As a result of the binder becoming liquid, the desired cohesion of the constituents is achieved. After the heating zone there follows a cooling zone, in which the adhesive fibers harden. After that, the material stream is cut to the desired length and the board is ready for use.

If the thermoplastic binders are wholly or partly replaced by supporting fibers comprising plant fibers, the oven temperatures are controlled in such a way that the flow transition range for parts of the mixed plastic is reached.

In addition, before the hardening of the synthetic resin, one or both large-area sides of the board can be provided with structures by a pressure roller. In this way, an improved surface is created for the adhesive bonding and also the plastering of the board according to the invention, if they are used, for example, as a wall or ceiling element in dry construction.

One variant in the board production provides that, instead of the structuring of the large-area sides of the boards, a fiber nonwoven is applied to one or both sides of the latter. In this way, an improved surface for the further processing is also achieved.

Of course, it is also possible to structure the one large-area side of the board and to apply a nonwoven to the other large-area side.

As a result of these measures, universal use of the sound-insulating boards according to the invention becomes possible.

In the finished board, the top side is for the most part composed of wood fibers, which means that the "wooden appearance" of the sound-insulating board is retained. The wood fibers are responsible for the good sound insulation, in particular footfall insulation, while the mixed plastic components on the lower side of the sound-insulating board have been enriched and, as a result, impart good compressive strength thereto. An increase in the compressive strength of 120 to 200% is achieved merely by the desired layer structure.

In the case of laminate floors, the sound-insulating board according to the invention can be bonded adhesively onto the laminate with the denser side, over the complete area or in strips. As a result of the increased proportion of mixed plastics on the fixed side of the footfall-insulating board, the product obtained is sufficiently pressure-resistant and the adhesive bonding is possible without difficulty.

In another type of application, the sound-insulating board according to the invention can be designed as an underlay board, on which the floor covering is then laid.

Another area of application of the sound-insulating board according to the invention, in particular in boards with thicknesses of more than 8 mm, results in dry construction. In this case, the boards can be adhesively bonded onto large-area structural elements, such as chipboards, OSB boards or Fermacell boards, for example as a floor-leveling board.

Likewise, the sound-insulating boards according to the invention can be used as wall and ceiling elements. Here, use is made in particular of those boards which bear a nonwoven on the large-area side on one or both sides, or whose large-area sides have been structured during production.

BRIEF DESCRIPTION OF THE DRAWINGS

The invention is to be explained in more detail below by using the drawings, in which.

DESCRIPTION OF THE PREFERRED EMBODIMENTS

Figure 1:
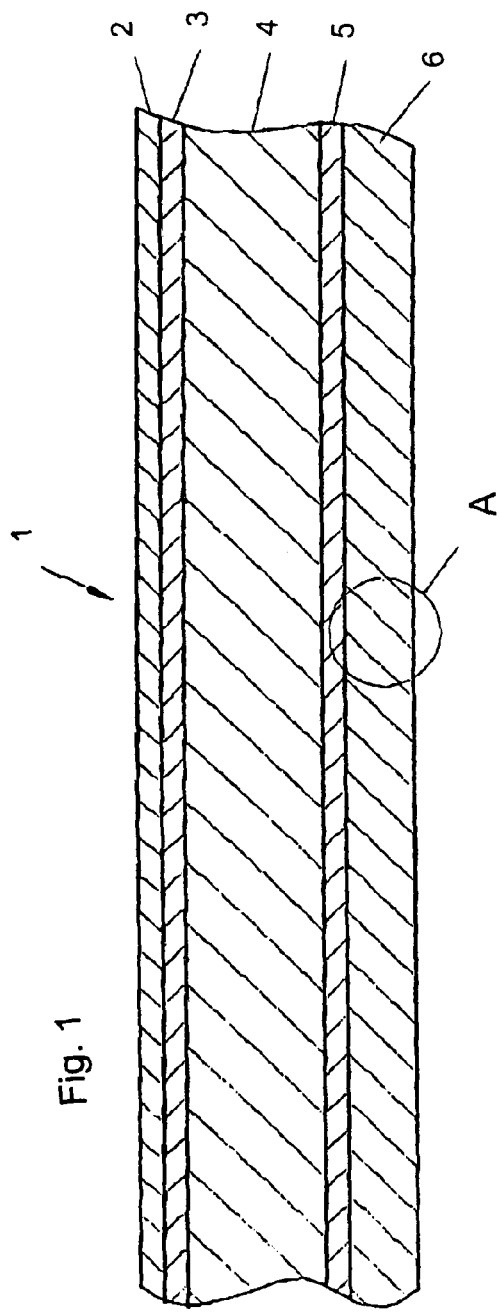
FIG. 1 shows a floorboard having the sound-insulating board according to the invention as a bottom layer.
Figure 2:
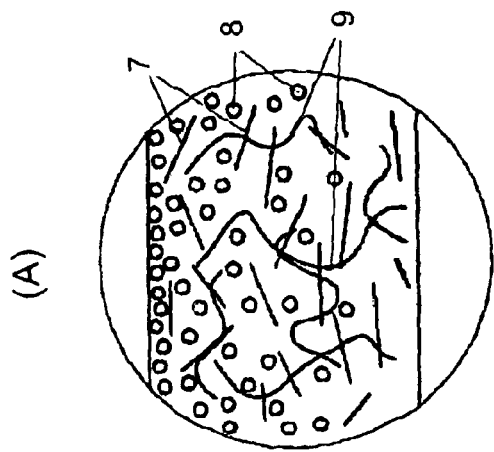
FIG. 2 shows a detail A of the sound-insulating board according to the invention from FIG. 1.

As can be gathered from FIG. 1, the floorboard 1 comprises the abrasion-resistant layer 2, the decorative layer 3, the supporting board 4, for example an HDF or MDF board, the backing 5 and the sound-insulating board 6 according to the invention. The structure of the sound-insulating board 6 according to the invention from one large-area side to the other large-area side is shown by FIG. 2. It can be seen that the proportion of the wood fibers 7 and the particles 8 of the mixed plastic from the dual system respectively decreases and increases from one side to the other side. On the other hand, the binder fibers and the supporting fibers 9 are distributed uniformly over the entire distance between the two large-area sides.

Figure 3:
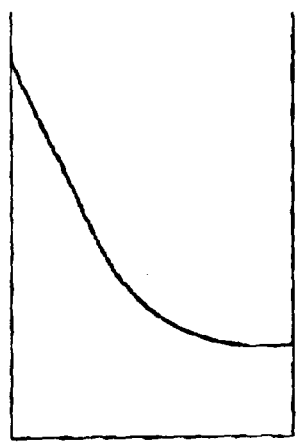
FIG. 3 shows a bulk density profile of the sound-insulating board according to the invention.

It can be seen from FIG. 3 that the bulk density likewise decreases as the proportion of mixed plastics 8 decreases.

I claim:

1. A sound-insulating board, comprising:
   50 to 60% of a mixture of unglued wood fibers, 42 to 30% of a mixed plastic of a type arising during a recovery of plastic parts from a dual system, and 8 to 10% of binders formed of thermoplastic synthetic resins and/or supporting fibers;
   the board having a substantially continuous gradient in a density thereof from one large-area side to an opposite large-area side thereof, with the mixed plastic substantially forming a lower layer of the board, the wood fibers substantially forming an upper surface layer of the board, and the mixed plastic and the wood fibers being mixed therebetween with the substantially continuous density gradient,
   with the mixed plastic having been enriched on a lower side of the board.

2. The sound-insulating board according to claim 1, which further comprises a hydrophobicizing agent and/or flame prevention agent.

3. The sound-insulating board according to claim 1, wherein the mixture partially contains binders and supporting fibers or supporting fibers and substantially no binder.

4. The sound-insulating board according to claim 1, wherein said supporting fibers are selected from the group of plant fibers consisting of hemp, straw, flax, and sisal, or synthetic resin fibers.

5. The sound-insulating board according to claim 4, wherein said supporting fibers are polyamide fibers.

6. The sound-insulating board according to claim 1, wherein said supporting fibers have lengths of 1 to 20 cm.

7. The sound-insulating board according to claim 6, wherein said supporting fibers have lengths of 13 to 15 cm.

8. The sound-insulating board according to claim 1, wherein said unglued wood fibers have a particle size from 0.3 to 1.2 cm and said mixed plastic has a particle size of 2.0 to 0.1 mm.

9. The sound-insulating board according to claim 8, wherein said unglued wood fibers have a particle size from 0.7 to 1.0 cm.

10. The sound-insulating board according to claim 8, wherein said unglued wood fibers have a particle size from 0.85 to 0.95 cm.

11. The sound-insulating board according to claim 8, wherein said mixed plastic has a particle size of substantially 0.2 mm.

12. The sound-insulating board according to claim 1, constructed with a thickness of 3 to 20 mm and a bulk density of 130 to 260 kg/m$^3$.

13. The sound-insulating board according to claim 1, constructed with a thickness of 3 to 6 mm and a bulk density of 200 to 260 kg/m$^3$.

14. The sound-insulating board according to claim 1, constructed with a thickness of 7 to 20 mm and a bulk density of 130 to 220 kg/m$^3$.

15. The sound-insulating board according to claim 1, which further comprises a fiber nonwoven disposed on one or both of said first and second large-area sides of the board.

16. The sound-insulating board according to claim 1, which further comprises structuring formed on one or both of said first and second large-area sides of the board.

17. The sound-insulating board according to claim 1, which further comprises a fiber nonwoven disposed on one large-area side and structuring on the other large-area side of the board.

18. The sound-insulating board according to claim 1, formed by blowing a mixture of the initial products comprising unglued wood fibers, mixed plastics from the dual system and binders and/or supporting fibers in a desired composition out of one or more storage containers onto a continuously moved transport belt, and allowing same to harden in an oven with temperatures in a flow transition range of the thermoplastic adhesive fibers used as binders or parts of the mixed plastics, and cutting off boards to a desired length.

19. The sound-insulating board according to claim 1, formed by blowing a mixture of the initial products comprising unglued wood fibers, optionally provided with a hydrophobicizing agent and/or a flame prevention agent, mixed plastics from the dual system, adhesive fibers and/or supporting fibers in a desired composition out of one or more storage containers onto a continuously moved transport belt, possibly structuring and/or applying a fiber nonwoven to one or both large-area sides of the mass stream, allowing same to harden in an oven with temperatures in the flow transition range of the thermoplastic adhesive fibers used as binders or parts of the mixed plastics, and cutting off boards to a desired length.

20. The sound-insulating board according to claim 1, which comprises finishing the board as a sound-insulating board for laminate floors.

\* \* \* \* \*